US005125992A

United States Patent [19]

Hubbard et al.

[11] Patent Number: 5,125,992

[45] Date of Patent: Jun. 30, 1992

[54] BULK RF ABSORBER APPARATUS AND METHOD OF MAKING SAME

[75] Inventors: Ronald N. Hubbard, Carlsbad; Gregory A. Kaiser, San Diego; James E. Staley, Escondido, all of Calif.

[73] Assignee: Brunswick Corp., Skokie, Ill.

[21] Appl. No.: 415,854

[22] Filed: Oct. 2, 1989

[51] Int. Cl.⁵ .............................................. B32B 31/00

[52] U.S. Cl. ...................................... 156/151; 29/458; 156/264; 204/192.1; 342/1; 342/4; 427/304; 428/316.6

[58] Field of Search ........................................ 342/1-4; 156/15, 264; 29/458; 204/192.1; 427/304; 428/316.6

[56] References Cited

U.S. PATENT DOCUMENTS 4,083,755 4/1978 Murata ................................ 427/304

4,439,768 3/1984 Ebneth et al. .......................... 342/1

FOREIGN PATENT DOCUMENTS 1242864 8/1971 United Kingdom ............. 428/316.6

*Primary Examiner*—John J. Gallagher

[57] ABSTRACT

A bulk RF absorber and a method for constructing same. The absorber is composed of multiple sheets of a reticulated dielectric material, each sheet being coated with at least one layer of radiation absorbing material to create a radiation absorption gradient across a width dimension of the sheet. The sheets are stacked with their respective absorption gradients aligned to form the bulk absorber. In one embodiment, the coated sheets are constructed by lengthwise feeding the dielectric material through a sputtering region and interposing a partial mask between the sputtering material and the face of the dielectric material. The contour of an edge of the mask, the sputtering rate and feed rate determine the resulting absorption gradient of the coated dielectric material. In another embodiment, a dipping process is used to coat each sheet with radiation absorption material.

18 Claims, 8 Drawing Sheets

BULK RF ABSORBER APPARATUS AND METHOD OF MAKING SAME

FIELD OF THE INVENTION

The present invention relates in general to absorbers of electromagnetic radiation and, more particularly, to bulk RF radiation absorbing material and a method for making same.

BACKGROUND OF THE INVENTION

Bulk RF (radio frequency) radiation absorbing material is employed in applications such as anechoic chambers. Typically in such applications, bulk resistive material, such as polystyrene foam loaded with carbon, is shaped into predetermined geometric forms to provide a desired bulk geometric resistive gradient. Such geometric forms include pyramids or wedges. While such bulk absorbers can generally provide absorption over a wide frequency range, e.g., 100 MHz to 100GHz, these absorbers nevertheless suffer a number of disadvantages.

One disadvantage arises when there is a need to mount the geometrically shaped absorber to point outward from a vertical surface, e.g. the wall of an anechoic chamber. In such cases, the conventional absorber may sag due to its own weight and a degradation of absorption performance may result. A second disadvantage arises from the practical limitation that the absorber needs to be fashioned into geometric shapes corresponding to simple linear functions to obtain economic yields. As a result, it is not possible to optimize the resistive gradient presented to the incident radiation in order to maximize absorption performance.

A third disadvantage arises from the difficulty in cooling geometrically shaped bulk RF absorbers due to the thermal insulating properties of the material of which the absorber is typically composed. As a result, there is a cooling capability limitation on the power levels that can be absorbed. Further disadvantages encountered in using geometrically shaped resistive material are angular dependence of the absorption performance and initial reflections experienced from the tips and rear of the geometric shapes. Additionally, where the absorber is applied in an anechoic chamber, the thickness of the absorber is based on the low frequency requirement of the chamber, e.g., six foot pyramidal absorbers are typically required to provide a $-50$dB reflection at 1 GHz. Such large pyramidal absorbers can appear as large flat surfaces when illuminated by high frequencies, e.g., at frequencies greater than 18GHz. Thus, pyramidal absorbers sized for good low frequency performance will degrade performance at high frequencies.

Thin, flat absorbers are known as an alternative to geometrically shaped bulk absorbing material. One example is the Salisbury screen which comprises a carbon or metal impregnated resistive sheet spaced one-quarter of a wavelength over a ground plane. Another example is the Jaumann sandwich absorber which consists of plural resistive sheets each having a different resistivity and spacing over a ground plane. Disadvantages generally suffered by such flat absorbers are limited absorption bandwidth and/or frequency selectivity.

A flat absorber structure is disclosed in U.S. Pat. No. 2,977,591. The patent discloses use of a non-conducting fibrous material, such as animal hair, in which conductive particles, such as graphite powder, are distributed and act to absorb energy. While some of the above described problems suffered by the geometrically shaped absorbers are likely overcome by the absorber material disclosed in the referenced patent, the use of discrete conductive particles as energy absorbing material may lead to electrical discontinuity that can detract from absorber performance.

SUMMARY OF THE INVENTION

Accordingly, it is an object of the present invention to provide an improved bulk RF absorber that is not subject to the aforementioned problems and disadvantages.

It is another object of the present invention to provide a bulk RF absorber that need not be formed into geometric shapes to provide a desired resistive gradient.

It is a further object of the present invention to provide a bulk RF absorber that is relatively lightweight.

It is an additional object of the present invention to provide a bulk RF absorber that can be easily cooled during operation.

It is yet another object of the present invention to provide a bulk RF absorber that provides a minimum of front surface and integrated reflection of incident radiation.

It is yet a further object of the present invention to provide a method for fabricating a bulk RF absorber that enables control of the resulting absorption gradient so that radiation absorptivity can be optimized.

It is yet an additional object of the present invention to provide a bulk RF absorber that when sized for low frequency radiation will not degrade performance at higher frequencies.

It is yet another object of the present invention to provide a bulk RF absorber having a performance that is not degraded as the incident angle of radiation approaches a grazing angle.

To achieve the objects and in accordance with the purpose of the invention, as embodied and described herein, the invention is directed to an electromagnetic radiation absorber. The absorber comprises a block of a reticulated dielectric material having a predetermined surface for receiving incident radiation to be absorbed, the block being formed of randomly oriented filaments of the dielectric material; and at least one layer of electromagnetic radiation absorbing material on the filaments of the block, the radiation absorptivity of the at least one absorbing material layer varying in accordance with a predetermined function along a gradient direction that is at a predetermined angle relative to the predetermined surface.

In another embodiment, the electromagnetic absorber of the invention comprises a plurality of sheets of a reticulated dielectric material having respective face surfaces in contact with one another, each sheet being formed of randomly oriented filaments of the dielectric material, each sheet of the radiation absorber being oriented to present an edge surface for receiving incident radiation to be absorbed; and at least one layer of electromagnetic radiation absorbing material on the filaments of each sheet, the radiation absorptivity of the at least one absorbing material layer varying in accordance with a predetermined function along a gradient direction that is substantially parallel to the face surface of each sheet and at a predetermined angle relative to the edge surface.

The present invention is further directed to a method for producing an electromagnetic radiation absorber, wherein the absorber comprises a block of dielectric material formed of randomly oriented filaments. The method comprises the steps of coating the filaments of the block with a predetermined catalyst; immersing the block into a bath containing a plating solution that includes an electrically conductive material, the conductive material plating onto the filaments coated with the catalyst; and withdrawing the block from the bath in a predetermined direction substantially parallel to a direction of a desired radiation absorption gradient to be formed in the block, the block being immersed and/or withdrawn at a predetermined rate corresponding to a predetermined function by which a coating thickness of the conductive material on the filaments is to vary along the direction of the desired radiation absorption gradient.

In another embodiment of the invention, a method for producing an electromagnetic radiation absorber comprises the steps of coating, with an electromagnetic radiation absorbing material, successive length portions of a reticulated dielectric material in sheet form having opposing sheet faces, the dielectric material being formed of a randomly oriented filaments the absorbing material being applied to the filaments to provide a predetermined radiation absorption gradient across a width dimension of each length portion of dielectric material; and forming a stack of individual length portions of coated dielectric material with the sheet faces of each length portion respectively contacting the sheet faces of the length portions positioned on either side thereof in the stack, the length portions being oriented in the stack to achieve a predetermined alignment of their respective absorption gradients and so that an edge surface, for receiving incident radiation, of each length portion is adjacent the respective edge surfaces of the length portions on either side thereof in the stack, the adjacent edge surfaces of the length portions forming a radiation absorptive face of the radiation absorber.

The accompanying drawings which are incorporated in and constitute a part of this specification, illustrate an embodiment of the invention and, together with the description, serve to explain the principles of the invention.

DESCRIPTION OF THE PREFERRED EMBODIMENT

Figure 1:
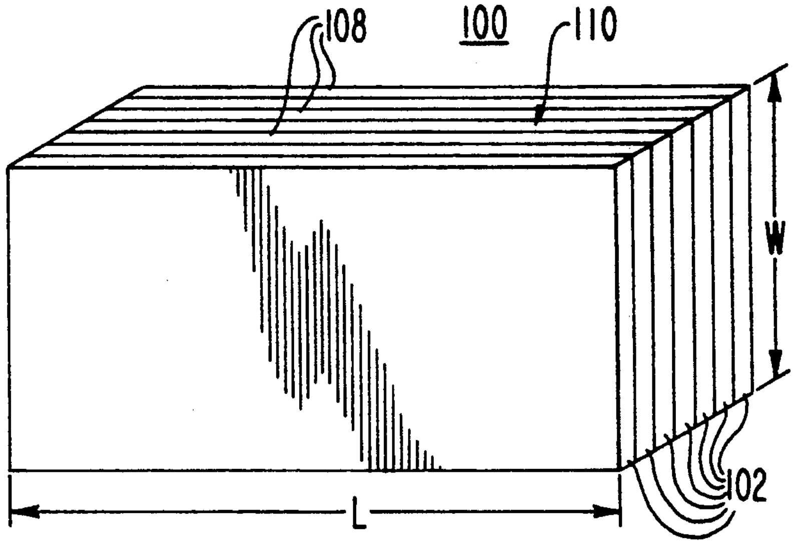
FIG. 1 illustrates a bulk RF absorber constructed in accordance with the present invention.

Referring now to the drawings, FIG. 1 diagrammatically illustrates a bulk RF absorber 100 constructed in accordance with the present invention. Absorber 100 comprises a plurality of individual rectangular sheets 102 of absorbing material formed into a stack. The respective faces of sheets 102 in the stack are in contact with and preferably bonded to one another to form absorber 100. Each sheet is constructed from a reticulated dielectric material that is preferably a light weight common open cell material such as polyurethane or a ceramic such as alumina. In view of the reticulated foam structure, each sheet consists of randomly oriented filaments of the dielectric material. The filaments are coated with at least one layer of an electromagnetic radiation absorbing material for absorbing incident radiation.

Figure 2:
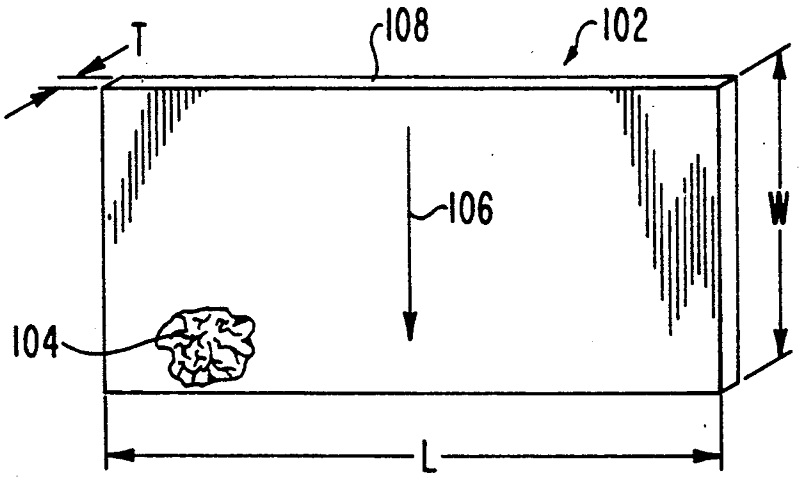
FIG. 2 illustrates a single sheet of dielectric material included in the absorber illustrated in FIG. 1.

Referring also to FIG. 2 which illustrates a single sheet 102, each sheet has a width dimension W, a length dimension L and a thickness dimension T. An exemplary thickness for each sheet is on the order of ⅛ to 12 inches. Exemplary length and width dimensions for each sheet are described below. The reticulated character of each sheet 102 is diagrammatically illustrated in a portion 104 of the sheet in FIG. 2. It is preferred herein that the layer of radiation absorbing material completely coat all filaments of each sheet in order to enhance radiation absorptivity. The thickness of the layer of radiation absorbing material applied to the filaments is substantially uniform through the sheet thickness (T) at any point on the sheet. However, the thickness of the absorbing material layer is varied across the width dimension (W) of the sheet, in accordance with a predetermined function, to create a desired radiation absorption gradient illustrated by arrow 106 in FIG. 2. It is preferred herein that the absorption gradient be constant as a function of position along the length dimension of the sheet. It is further preferred that the gradient be substantially parallel to the width dimension and substantially perpendicular to an edge surface 108 of each sheet. The absorbing material layer is applied with a varying thickness that increases in the direction of arrow 106, so that the radiation absorptivity of each sheet 102 increases as electromagnetic radiation propagates in the direction of arrow 106. Edge surface 108 represents the least discontinuity with the adjacent air and is intended to be presented for receiving incident radiation. Referring again to FIG. 1, sheets 102 are preferably stacked to form absorber 100 so that their respective edge surfaces 108 are adjacent to one another and together form an absorbing face 110 of absorber 100 for receiving incident radiation. In accordance with the illustrated embodiment, each sheet has the same absorption gradient oriented at the same angle relative to its edge surface.

The absorbing materials with which the filaments of each sheet 102 can be coated are electrically conductive and include, but are not limited to, materials such as palladium, gold, copper, aluminum, nickel, chromium, titanium, silver, monel, inconel, permalloy, nichrome and similar alloys, stainless steels and cermets. Each layer of electrically conductive material as applied to the filaments of the dielectric material sheet is characterized by its effective complex permittivity and permeability which in turn is a function of the bulk material properties and the layer thickness.

Figure 3A:
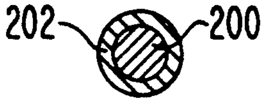
FIGS. 3A, 3B and 3C illustrate an exemplary filament of dielectric material coated with radiation absorbing material.

FIG. 3A illustrates an enlarged cross-sectional view of an exemplary filaments 200 of sheet 102. For convenience, the filaments is illustrated as having a circular cross section though this need not be the case. Filament 200 has been coated with a layer 202 of electrically conductive material. Since as stated above, it is preferred that all filaments in each sheet be as completely coated as possible, layer 202 is a continuous or nearly continuous coating of the electrically conductive material and thereby provides electrical continuity along the contiguous filaments structure of sheet 102. This continuity enhances the radiation absorptivity of each sheet. As indicated above, the thickness of the coating applied to the filament varies across the width dimension (W) of sheet 102. The coating thickness will also vary as a function of the conductive material in view of the radiation absorption characteristic to be achieved. For example, when a layer of aluminum is applied as the conductive coating, its thickness may vary in the range from less than 10 angstroms to 2000 angstroms.

Figure 3B:
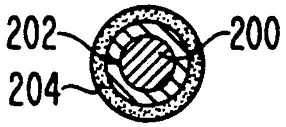

Since the various electrically conductive radiation absorbing materials can provide different radiation absorption characteristics, the filaments of each sheet can be coated with multiple layers of different conductive materials. In such a case, the various conductive materials and their respective coating thickness ranges are selected so that their respective radiation absorption characteristics complement one another. Each layer can be applied to provide a different absorption gradient, with the bulk absorber having a composite absorption gradient that represents the combined effects of the individual absorption gradients. FIG. 3B diagrammatically illustrates a cross-sectional view of exemplary fiber 200 which has been initially coated with the above-described layer 202 of electrically conductive material and subsequently coated with a second layer 204 of an electrically conductive material different from the material of layer 202.

Figure 4:
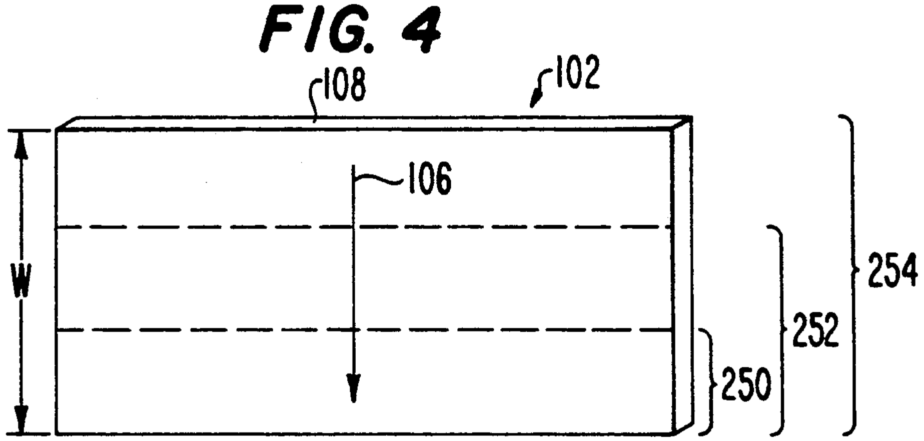
FIG. 4 illustrates a single sheet of dielectric material coated with multiple layers of radiation absorbing material.

FIG. 4 illustrates an example of the manner in which multiple layers of electrically conductive material can be disposed on a sheet of dielectric material. It is intended that the multiple sheets of material forming absorber 100 are respectively coated in the same manner. Thus, FIG. 4 illustrates one sheet 102 having the absorption gradient represented by arrow 106. To achieve the gradient with the illustrated orientation, the conductivity of the filament coatings must increase with increasing depth into sheet 102 along gradient direction 106. In this example, the increasing conductivity is achieved by coating the filaments with three different conductive materials. First, the filaments of a region 250 at the greatest depth of the sheet, along dimension W, are coated with a highly conductive material such as gold. Next, a material of medium conductivity, such as nickel, is applied to coat the filaments in a region 252 that includes region 250 as well as a mid-depth region of sheet 102. As a result, the layer of gold is overcoated with the layer of nickel. Last, a relatively low conductivity material, such as nichrome, is applied to coat the filament in a region 254 that includes regions 250 and 252 as well as a depth portion of sheet 102 nearest edge 108. As a result, substantially all filaments in sheet 102 are coated with the low conductivity material. Thus, the fibers in region 250 are coated with three layers of different conductive materials, while the fibers of region 252 are coated with two layers. The thickness of each layer within each region is preferably varied along the gradient direction. One advantage of providing a low conductivity layer is that it obviates the need to achieve low conductivity by applying a very thin layer of high conductivity material, e.g., gold. Application of such a layer of high conductivity material is difficult to achieve and such a thin layer may not adequately adhere to the filaments. In contrast, the layer of low conductivity material is suitably thick to avoid such problems.

Figure 5:
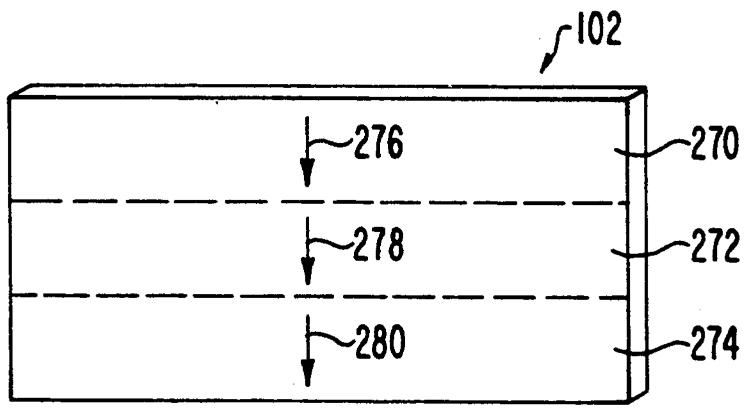
FIG. 5 illustrates a single sheet of dielectric material having multiple absorption gradient regions.

An additional feature of the present invention is the ability to construct an RF absorber having multiple absorption gradient regions across the width dimension of each sheet. This feature is illustrated in FIG. 5 in which one sheet 102 is divided into gradient regions 270, 272 and 274 having respective absorption gradients indicated by arrows 276, 278 and 280. These different absorption gradients may be achieved by applying one or more layers of different absorbing materials and/or different material thicknesses in each of the three gradient regions. A method by which each sheet 102 can be constructed to provide different gradient regions is described below.

Figure 3C:
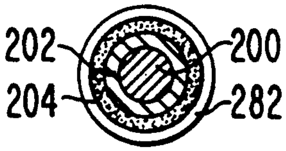

Further in accordance with the present invention, it is preferred that an overcoat of a dielectric material, for example polyvinyl alcohol, acrylic resins, epoxy resins, lacquers or silicon dioxide, be applied over the one or more layers of radiation absorbing material on the filaments. Such a dielectric overcoat layer is preferred because it affords greater product stability by protecting the thin conductive radiation absorbing layers and filament structure from mechanical abuse and exposure to degrading chemicals or environments. The overcoat layer can also serve the dual purpose of a bonding agent to bond the respective face surfaces of sheets 102 to one another in absorber 100. Polyvinyl alcohol, acrylic resins, epoxy resins or lacquers can serve such a dual purpose. FIG. 3C illustrates a dielectric overcoat layer 282 applied over the electrically conductive layers illustrated in FIG. 3B.

As described above, the radiation absorption characteristics of the bulk absorber are a function of the radiation absorbing materials with which the filaments are coated and the corresponding absorption gradients. The absorption characteristics of the bulk absorber are further a function of the width dimension W of sheets 102. This is the dimension along which the incident radiation being absorbed propagates and therefore represents a depth of the absorber penetrated by the radiation. As a result, a sufficient absorber depth must be provided to achieve complete radiation absorption over a range of wavelengths of incident radiation. Thus, the absorption characteristic provided by the radiation absorbing material and the bulk absorber depth are interdependent parameters to be optimized for each bulk absorber application. By way of example only, a bulk absorber coated with gold or palladium can have a depth on the order of 3 feet to be effective for absorbing RF radiation in a wavelength range of 1GHz to 100GHz.

While the bulk RF absorber of the present invention has been described as constructed from multiple, individually coated sheets of dielectric material, the invention is not so limited. Bulk absorber 100 can be constructed from a single, generally rectangular block of dielectric material such as block 290 illustrated in FIG. 6. Block 290 is preferably composed of the same open cell material described for sheets 102. The filaments of block 290 would also be coated to provide an absorption gradient along the direction of arrow 106. The block would therefore include absorbing face 110 intended for receiving incident radiation. A method by which the filaments of block 290 are suitably coated to achieve a desired absorption gradient is described below.

In use, bulk RF absorber 100, as illustrated in FIG. 1, serves as a building block for constructing a radiation absorbing surface such as in an anechoic chamber. Each absorber 100 can be constructed of an arbitrary number of sheets 102 and the length of each absorber 100 can be selected to suit the needs of the particular installation. Further, while most conveniently constructed of rectangular sheets 102, absorber 100 can be cut to fit the physical limitations dictated by the installation. The only constraint in this regard is that the absorptivity of each absorber 100 depends in part on dimension W, as described above. Alternatively, with the absorber provided as block 290, a plurality of such blocks can be mounted to form the absorbing surface of an anechoic chamber. With absorbers 100 installed with their respective absorbing faces positioned to receive incident radiation, the absorbers will absorb that incident radiation with an effectiveness determined by the absorption gradient corresponding to the layer or layers of radiation absorbing material and the depth (dimension W) of the absorbers. The layer(s) of electrically conductive material coating the filaments of the absorber interacts with the electric field component of the incident RF radiation, producing currents in the material. With the absorber properly designed, these currents produce very little scattered fields, and the radiation is thereby absorbed.

Figure 7:
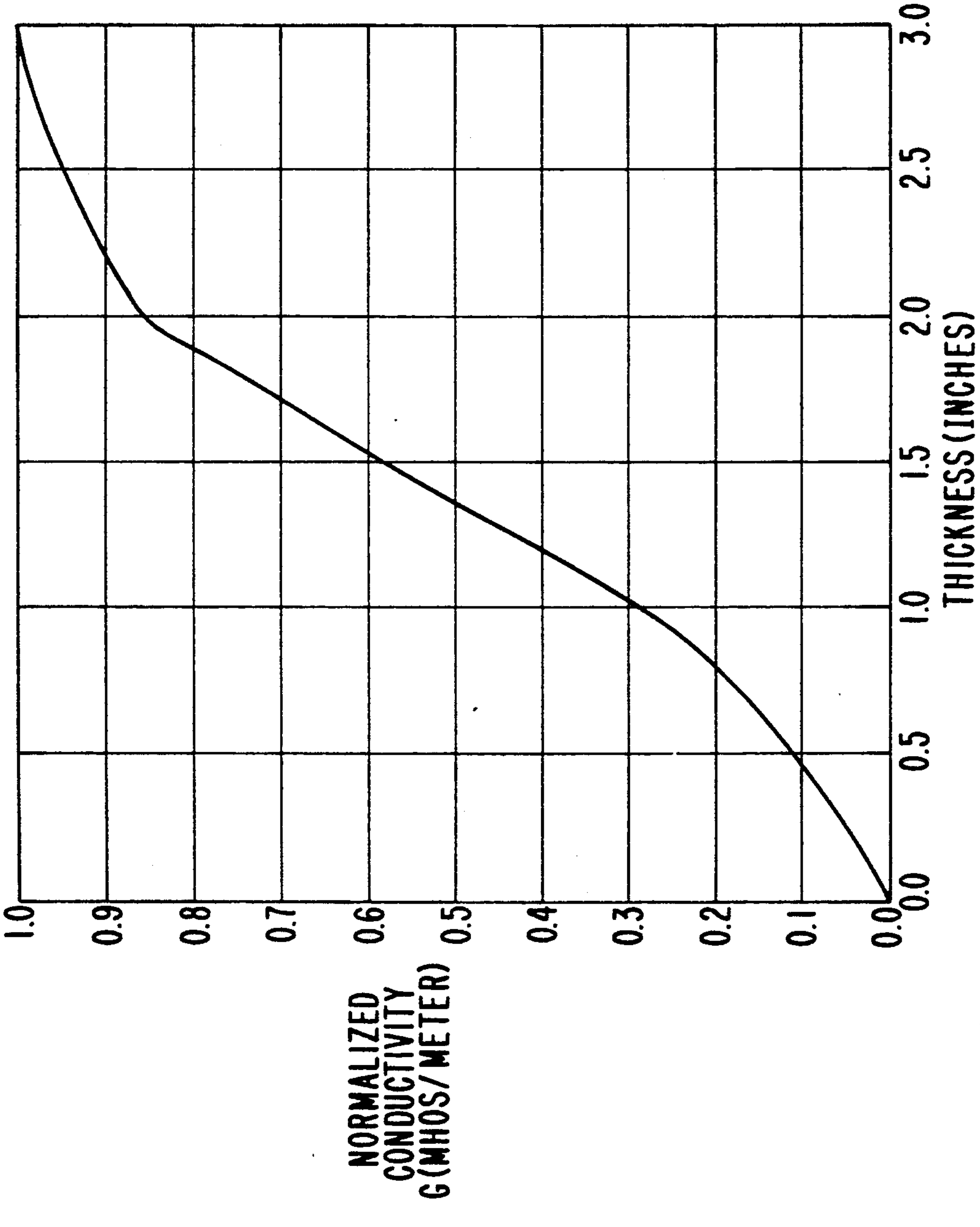
FIG. 7 illustrates a graph of normalized conductivity plotted as a function of absorber depth for a bulk RF absorber of the present invention.
Figure 8:
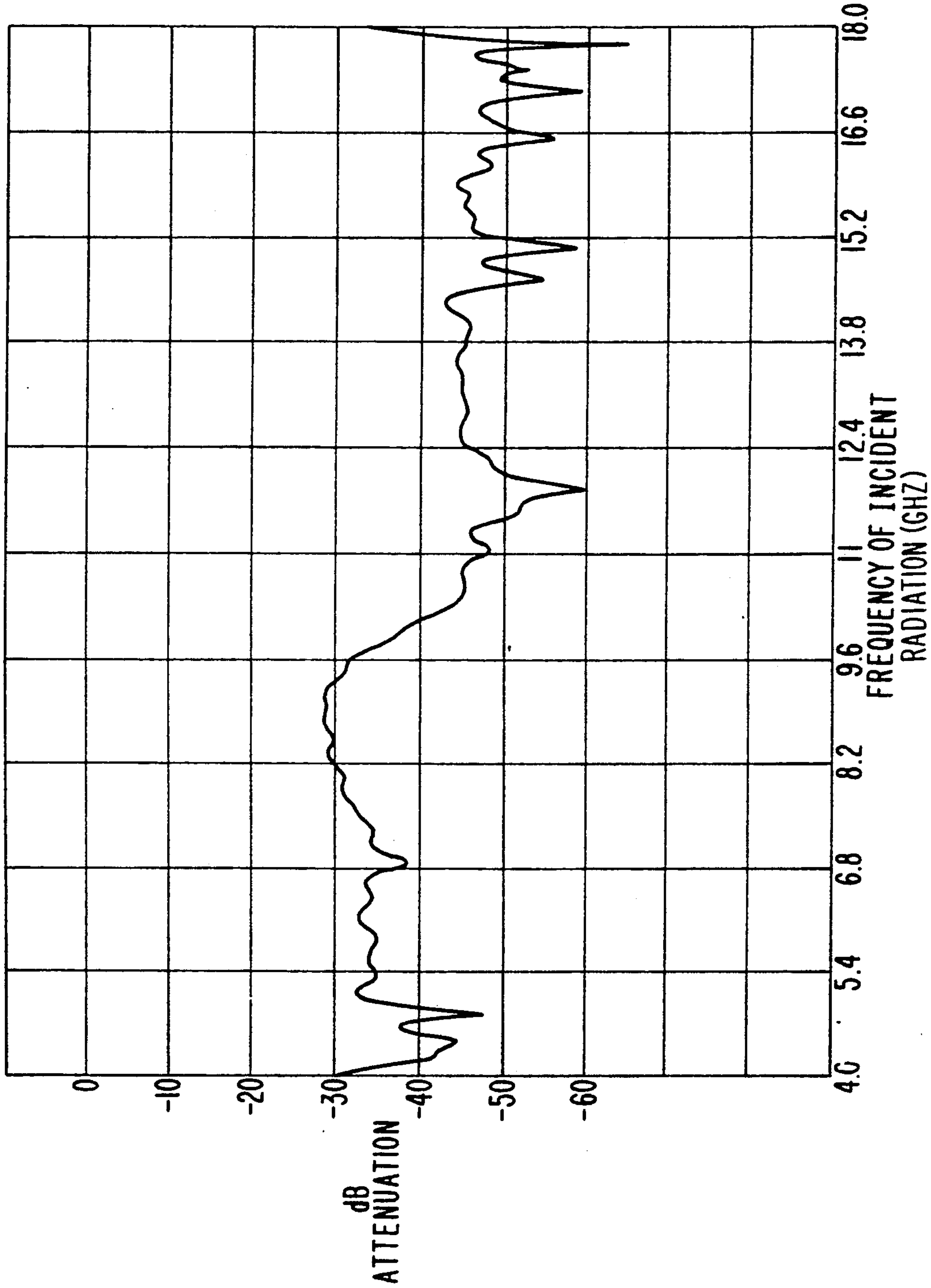
FIG. 8 illustrates a graph of attenuation plotted as a function of incident radiation for a bulk RF absorber of the present invention.

Characteristics of an actually constructed prototype bulk RF absorber of the present invention are described next. The absorber was constructed from a plurality of sheets of reticulated foam each having a thickness of approximately 0.125 inches. The absorber had a depth (dimension W) of approximately 3 inches and was mounted to cover a two foot by two foot metal plate. The filaments of the absorber were coated with gold having a thickness ranging from less than 20 angstroms to approximately 1,000 angstroms. FIG. 7 illustrates a graph of the normalized conductivity (mhos/meter) plotted against absorber depth (inches) for the prototype absorber. FIG. 8 illustrates a graph of attenuation (dB) plotted against incident radiation frequency (GHz) to show the measured performance of the prototype absorber between 4.0 and 18.0 GHz as the attenuated return from the two foot by two foot metal plate covered by the absorber. The incident radiation was normal to the front face of the absorber.

The bulk RF absorber of the present invention as thus far described provides advantages over prior art geometrically shaped absorbers. The open cell structure of the dielectric material of the absorber provides a minimal discontinuity in the dielectric constant at the air interface with the absorbing face, e.g., face 110 of absorber 100 in FIG. 1. As a result, there is very little front face reflection of the incident radiation. Also, since the absorber is an effective absorber of incident radiation, the integrated reflection from the absorber, i.e., from all depths of the absorber, is minimal. Another advantage of the open cell structure is the opportunity it affords for cooling the bulk absorber, during operation, by circulating air through it. As a result, relatively high power levels of RF radiation can be absorbed.

Figure 9:
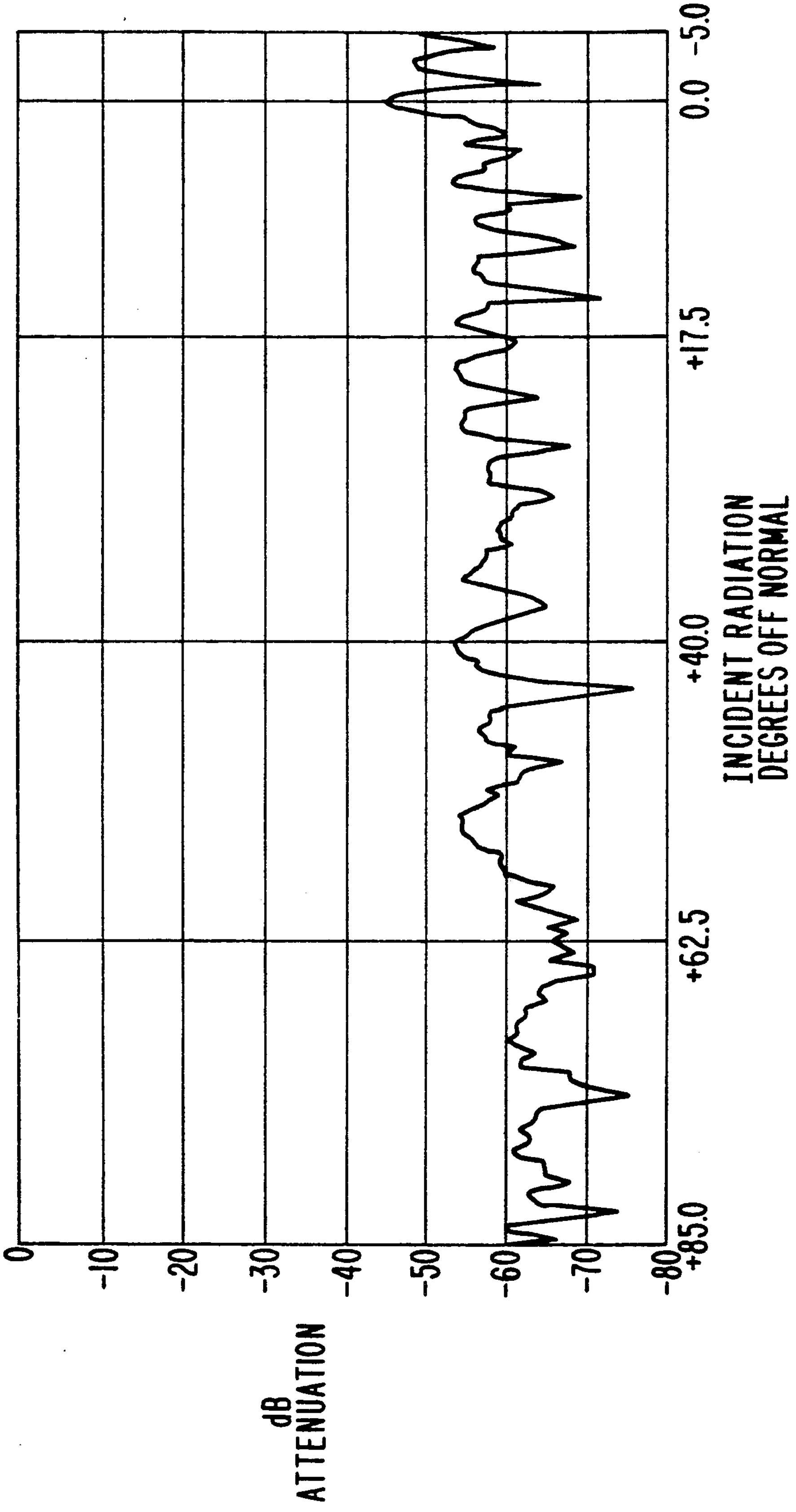
FIG. 9 illustrates a graph of attenuation plotted as a function of off-normal angle for a bulk RF absorber of the present invention.

An additional advantage provided by the bulk RF absorber of the present invention derives from the fact that the reticulated dielectric material is lightweight and therefore easy to handle and install. Further, since the absorber does not rely on a particular geometric shape to achieve an absorption gradient, its absorption does not degrade as the radiation angle of incidence to the front face varies from normal. In view of this, the placement of the bulk absorber material in an anechoic chamber is less critical and the material is well suited to absorption of radiation that has an incident angle ranging from normal to grazing angles. FIG. 9 illustrates a graph of the attenuation of the above-described prototype absorber, having a 3 inch depth (dimension W), plotted against a variation of the "off-normal" angle of incident radiation, that is, the angle of the incident radiation measured relative to the normal to the absorber front face. The incident radiation had a substantially constant frequency of 10 GHz. As can be seen, the attenuation is relatively insensitive to the incident angle.

Yet another advantage of the bulk RF absorber of the present invention is the ability to optimize the absorption gradient. For example, the absorption gradient, if desired, can conform to a non-linear function. The manner by which this is achieved is described in greater detail below with respect to the method for producing sheets 102.

Figure 10:
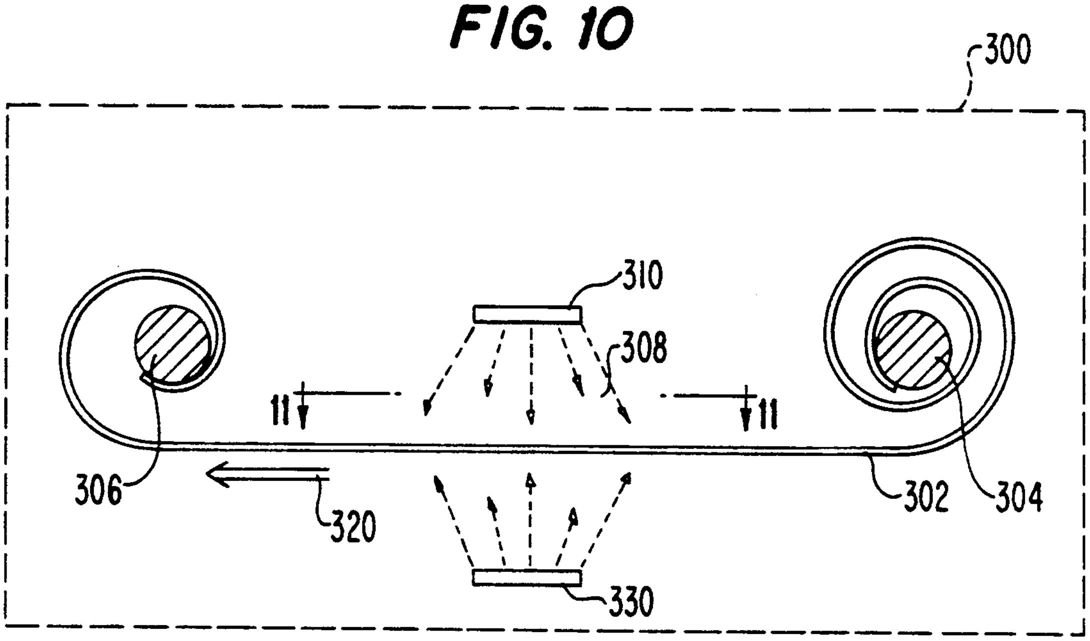
FIG. 10 illustrates a sputtering technique used in a coating step of the method of the present invention.

The present invention is also directed to a method by which the inventive bulk RF absorber is constructed. FIG. 10 diagrammatically illustrates a sputtering chamber 300 containing a continuous length 302 of open cell, uncoated polyurethane that is initially stored on a supply spool 304. A free end of length 302 is attached to a take-up spool 306. In sputtering chamber 300, the length of polyurethane is drawn through a sputtering region 308 in which an electrically conductive material 310 is sputtered onto one sheet face of the polyurethane. With respect to the electrically conductive materials listed above, palladium and nichrome are preferably deposited by sputtering. The technique of sputtering is well known and is not described in detail herein.

Figure 11:
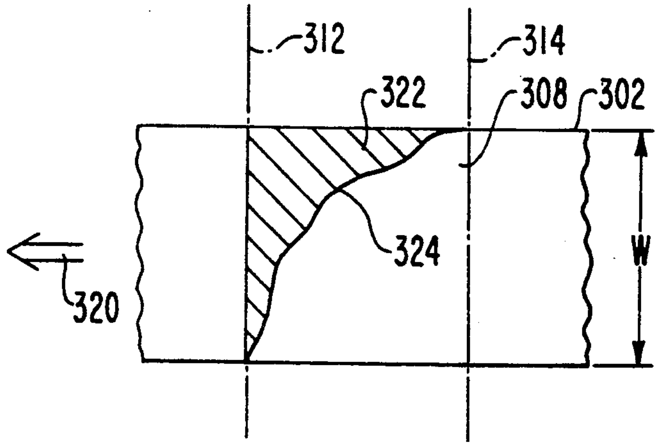
FIG. 11 is sectional view along the line 11—11 shown in FIG. 10.

As a result of sputtering material 310 onto one sheet face of the polyurethane, the individual filaments thereof are partially coated with a layer of that conductive material. Referring also to FIG. 11 which is sectional view along the line 11—11 of FIG. 10, sputtering region 308 is arbitrarily delineated by lines 312 and 314. The surface area of the polyurethane outside the sputtering region may be masked to assure that substantially no conductive material is sputtered onto the polyurethane outside region 308. During the sputtering operation, the polyurethane is lengthwise continuously fed through the sputtering region, in the direction indicated by arrow 320 (FIGS. 10 and 11) by driving take-up spool 306 at a predetermined rate. As seen in FIG. 11, a mask 322 is applied across the width dimension W of the polyurethane, that being the same width dimension as illustrated in FIG. 2. Mask 322 includes an edge 324 that is contoured to achieve an arbitrary function corresponding to a desired absorption gradient. Mask 322 as configured in FIG. 11 provides a linear function which, as length 302 of polyurethane is fed through sputtering region 308, causes the amount of conductive material deposited on the polyurethane to increase across the width W in the downward direction as viewed in FIG. 11. Thus, the rate at which the polyurethane is fed through the sputtering region, the rate at which the conductive material is sputtered onto the polyurethane and the gradient function represented by mask 322 are controllable factors that determine the radiation absorption gradient that will be achieved.

As indicated above, it is preferred herein to provide a complete coating of the filaments through the thickness dimension of the dielectric material. Since this is most likely not accomplished by sputtering from a single side, it is preferred that the opposing sheet face of the polyurethane also be subjected to the same sputtering process, i.e., with the same mask, sputtering rate and feed rate. This can be accomplished by feeding length 302 through sputtering region 308 a second time with the previously unexposed face of the polyurethane presented for sputtering. In such a case, the length of polyurethane would be fed through region 308 so that the direction of increasing conductive material layer thickness across the width dimension of the sheet is the same as was applied to the first sheet face. Alternatively, a second piece of conductive material 330, for sputtering onto the polyurethane, can be positioned symmetrically with material 310 and confronting the opposing sheet face of the polyurethane. A second mask identical to mask 322 would be interposed between material 330 and the surface of the polyurethane to perform the same function as mask 322.

Figure 12:
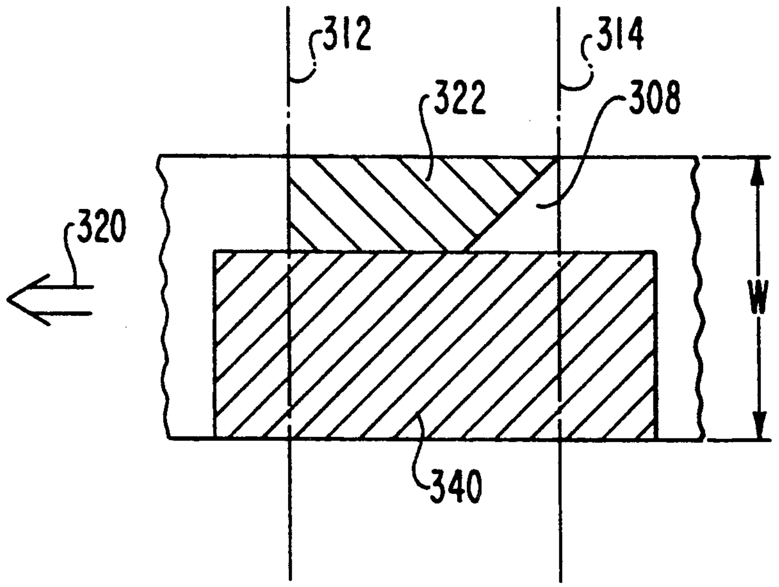
FIG. 12 illustrates the use of a mask, in conjunction with the method of the present invention, to enable construction of a single sheet of dielectric material having multiple absorption gradient regions.

In order to construct a sheet 102 having multiple distinct gradient regions as illustrated in FIG. 5, the coating method as illustrated in FIGS. 10 and 11 may be modified as illustrated in FIG. 12. FIG. 12 provides the same sectional view 11—11 as shown in FIG. 11 except that a second mask 340 is positioned to block sputtering of an entire width portion of the polyurethane sheet. As a result, only a portion of the width of polyurethane, e.g., corresponding to gradient region 250 in FIG. 5, is exposed to sputtering.

Following completion of the coating of the dielectric material filaments by sputtering, it is necessary to cut the continuous length of dielectric material, across width dimension W, into substantially equal length portions in order to provide individual sheets 102 (FIGS. 1 and 2). Next, the individual length portions are formed into a stack with the sheet faces of each length portion in contact with the sheet faces of the length portions positioned on either side thereof in the stack. In the course of performing this step and as preferred herein, each individual length portion is first spray coated with an overcoat of dielectric material, such as the above noted polyvinyl alcohol, that also serves to bond the respective sheet faces to one another in the stack. It is important to note that no direct electrical conductive contact between adjacent sheets in the stack is required for successful operation of absorber 100.

Further with respect to the stacking step, the individual length portions are preferably oriented in the stack to achieve a parallel alignment of their respective absorption gradients and so that the edge surface 108 of each length portion is adjacent to the respective edge surfaces of the length portions on either side thereof in the stack. As a result, the adjacent edge surfaces form the radiation absorptive face 110 of absorber 100. It is further preferred that edge surfaces 108 be oriented so that face 110 is substantially planar.

While sputtering is a preferred technique for coating the filaments of the dielectric material, other coating techniques may be employed with equal effectiveness. Such coating techniques include plasma deposition, chemical vapor deposition, photo induced chemical vapor deposition, molecular beam epitaxy, evaporation, plasma spraying, ion beam deposition, chemical plating and flame spraying. The techniques of flame spraying and plating are relatively economical to carry out. Flame spraying is a process in which a conductive material is melted in an intense flame and "sprayed" by the use of an inert gas under pressure. Coating the dielectric material by flame spraying is carried out in substantially the same manner as described above for sputtering as illustrated in FIG. 10–12. Thus, in FIG. 10, material 310 may be replaced by a sprayer, appropriately spaced from the dielectric material. Then, a continuous length of the reticulated dielectric material is fed through a region in which at least one sheet face of the material is exposed to the spraying. Mask 322 is interposed to provide a desired gradient function, so that the feed rate, spraying rate and mask configuration determine the nature of the coating achieved.

The chemical plating technique for coating the filaments of the dielectric material with a layer of electrically conductive material involves a dipping process. In accordance with this process, an uncoated sheet of dielectric material is dipped into a series of baths one of which contains a catalyst to induce the plating. The baths are any one of several commercially available solutions such as supplied by Enthone Incorporated of New Haven, Conn. or the Dynachem Division of Morton Thiokol, Inc. of Tustin, Calif. The catalyst dip is performed in such a manner that all dielectric filaments are uniformly coated with the catalyst material. The next step of the dipping process is described in conjunction with FIG. 13 in which a sheet 400 of dielectric material coated with the catalyst has been submerged into a container 402 containing the electrically conductive material in a liquid solution 404. The liquid level of the solution is indicated by reference numeral 406. Due to the respective natures of the catalyst and the conductive material solution; a chemical reaction commences between the two with the result that the conductive material is plated onto the filaments of the dielectric material. The thickness of the conductive material layer depends, in part, on the length of time the catalyst coated dielectric material remains in contact with the conductive material solution. In view of this dependence, the thickness of the conductive material layer can be varied in accordance with a predetermined function, by correspondingly varying the rate at which sheet 400 is immersed in and withdrawn from solution 404. Alternatively, the sheet can be rapidly immersed in the solution and only the rate of withdrawal controlled in accordance with the predetermined function. As another alternative, the sheet can immersed at the controlled rate and withdrawn rapidly. Exemplary combinations of catalyst and conductive material solutions with which this plating technique can be practiced include tin chloride/palladium chloride catalyst solutions and nickel, gold, copper and palladium.

Figure 13:
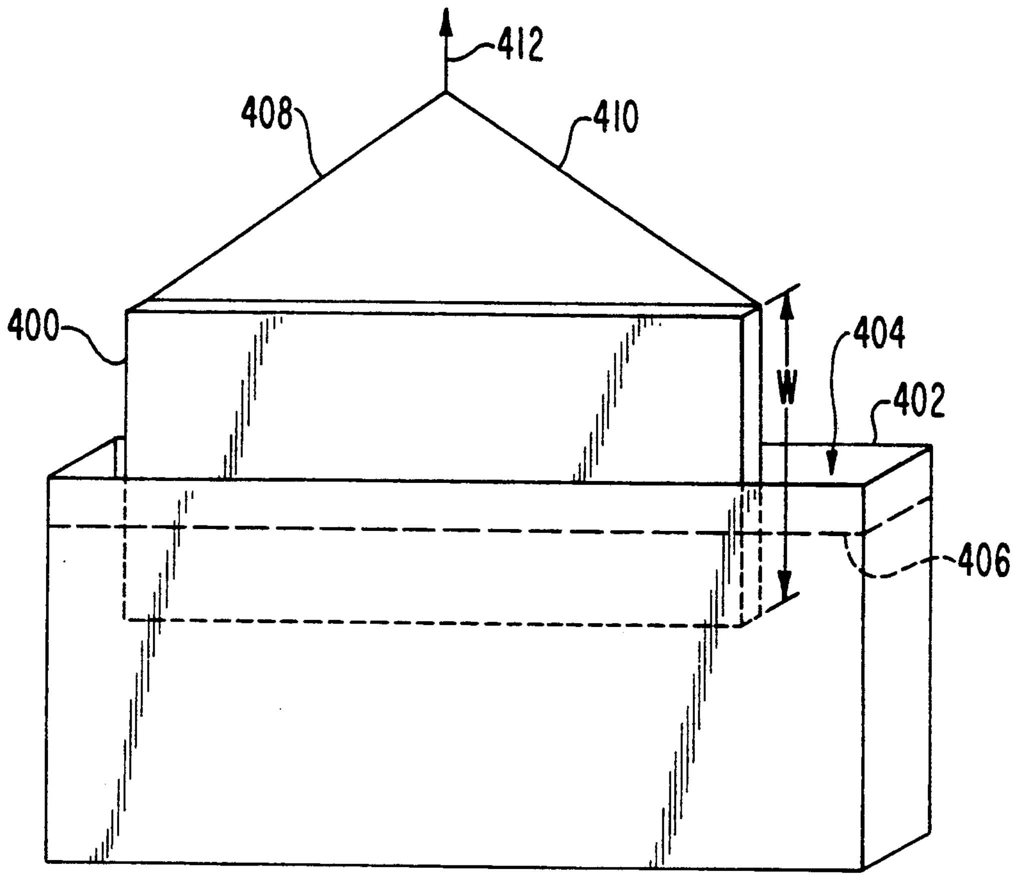
FIG. 13 illustrates a dipping technique used in a coating step of the method of the present invention.

FIG. 13 illustrates guide wires 408 and 410 connected to the corners of sheet 400 and the sheet being pulled upward, as indicated by a directional arrow 412, and thereby withdrawn from solution 404. Thus, sheet 400 was previously completely submerged in solution 404 and is illustrated in FIG. 13 at an intermediate stage of withdrawal from the solution. It is important to note that sheet 400 is oriented with its width dimension W parallel to direction 412 so that the resulting absorption gradient achieved will have the same orientation described above with respect to absorber 100. It is preferred that sheet 400 be immersed and withdrawn under control of a stepping motor that is in turn under computer control to vary the immersion and withdrawal rates in accordance with the predetermined function corresponding to the desired absorption gradient.

Figure 6:
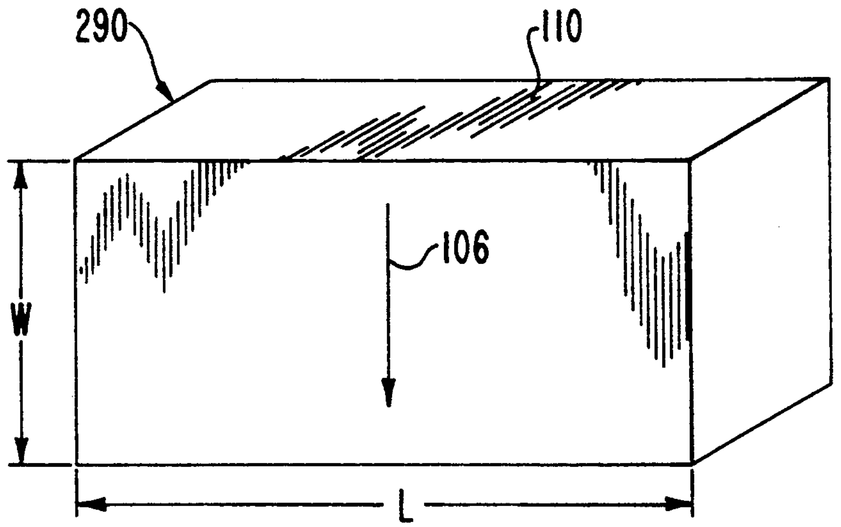
FIG. 6 illustrates the bulk RF absorber of the present invention constructed from a single block of dielectric material.

In the case where a single block of dielectric material, such as block 290 illustrated in FIG. 6, is used instead of multiple sheets of material, the chemical plating technique is the preferred method by which the filaments of the block are coated with electrically conductive material. This plating would be achieved by the same dipping process described above and illustrated in FIG. 13 for coating the filaments of an individual sheet of dielectric material. Thus, the filaments of the block would first be coated with the catalyst. Then, the block would be immersed in the plating solution. The rate of immersion into and/or withdrawal from the solution would be controlled to achieve the desired radiation absorption gradient of the single block.

With respect to coating the dielectric material in sheet form, except for the dipping process, the other coating techniques described above are preferably practiced by feeding the continuous length of dielectric material, e.g., polyurethane, through the sputtering or spraying region. Subsequently, the continuous length is cut into length portions 102 for stacking. However, the initially uncoated length of dielectric material could be cut into the length portions prior to coating and those individual portions then fed through the coating process.

While it is preferred herein that the individual length portions of coated dielectric material be stacked with their respective absorption gradients aligned, there may be applications in which it is more effective, with respect to radiation absorptivity, to intentionally misalign the gradients. Since this would result in the edges of the individual length portions being correspondingly misaligned, it may be desired to cut the sides of the stack to achieve planar faces. This would be especially desirable with respect to face 110 (FIG. 1) of the absorber. Further, while it is preferred that each length portion in the stack have substantially the same absorption gradient, a stack could instead be formed from length portions having respectively different gradients. The variation in gradient from length portion to length portion could also be predeterminedly arranged to achieve a desired absorption performance.

Figure 14:
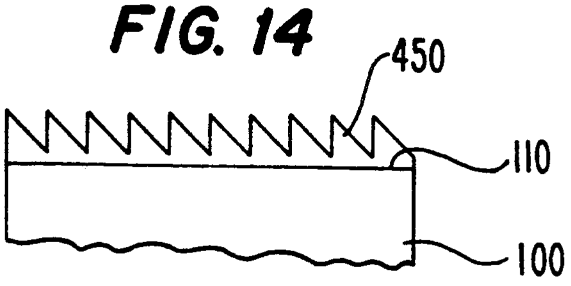
FIG. 14 illustrates a bulk RF absorber of the present invention modified to further minimize the reflection of incident radiation from the front face.

While the open cell structure of the absorber of the present invention provides a minimal discontinuity in the dielectric constant at the air interface with the absorber front face, this interface can be modified to further minimize the reflection of incident radiation from the front face. Such modification includes roughening the front face of the absorber, to impart a predetermined relief pattern, such as a saw tooth pattern, to the face. Alternatively, a layer of uncoated dielectric material having the predetermined relief pattern on its face may be positioned on top of the absorber front face to present the pattern to incident radiation. This latter alternative is illustrated in FIG. 14 which diagrammatically shows a side view of a portion of absorber 100 including face 110 with a layer of uncoated dielectric material 450 having a saw tooth pattern positioned on top thereof. The orientation of the saw tooth pattern is not critical. An exemplary thickness of layer 450 is approximately three inches.

Although it is preferred herein that the absorption gradient remain constant along the length dimension of each sheet of dielectric material, it may be advantageous in certain applications to vary the gradient as a function of position along the sheet length. Such variation could be easily achieved by varying the feed rate through the spraying or sputtering region, varying the spraying or sputtering rate, or periodically or continuously changing the mask corresponding to mask 322 in FIG. 6.

While the individual length portions of dielectric material are preferably coated so that the direction of the absorption gradient is substantially perpendicular to edge surface 108 and parallel to the width dimension W, the invention is not so limited. In the alternative, it may be desirable to provide the coating by the sputtering or spraying techniques, such a skewed gradient can be achieved by changing the sputtering or spraying rate, dielectric material feed rate, or mask orientation. With respect to the dipping technique, the skewed gradient is readily achieved by simply skewing the length portion of the dielectric material relative to the liquid solution, i.e., orienting the length portion with its width dimension W skewed relative to the liquid level 406 (FIG. 13).

While it is preferred herein to retain the open cell nature of the reticulated dielectric material, the invention is not so limited. It may be desirable in certain applications to impart structural rigidity to absorber 100. One manner in which this can be accomplished is by filling the void volume of the absorber with low dielectric structural material, e.g., syntactic foam.

Thus, it is intended that the present invention cover the modifications and the variations of this invention provided they come within the scope of the appended claims and their equivalents.

What is claimed is:

1. A method for producing an electromagnetic radiation absorber, said absorber comprising a block or reticulated dielectric material being formed of randomly oriented filaments, said method comprising the steps of:

coating the filaments of said block with a predetermined catalyst;

immersing said block into a bath containing a plating solution that includes an electrically conductive material, said conductive material plating onto said filaments coated with said catalyst; and withdrawing said block from said bath at a predetermined withdrawal rate and in a predetermined direction substantially parallel to a direction of a desired radiation absorption gradient to be formed in said block, said predetermined withdrawal rate corresponding to a predetermined function by which a coating thickness of said conductive material on said filaments is to vary along the direction of said desired radiation absorption gradient.

2. The method of claim 1 wherein the immersing step includes the substep of immersing said block into said plating solution bath at a predetermined immersion rate corresponding to said predetermined function.

3. A method for producing an electromagnetic radiation absorber, comprising the steps of:

coating, with an electromagnetic radiation absorbing material, successive length portions of a reticulated dielectric material in sheet form having opposing sheet faces, said dielectric material being formed of randomly oriented filaments, said absorbing material being applied to said filaments to provide a predetermined radiation absorption gradient across a width dimension of each said length portion of dielectric material; and forming a stack of individual length portions of coated dielectric material with the sheet faces of each said length portion respectively contacting the sheet faces of said length portions positioned on either side thereof in the stack, said length portions being oriented in said stack to achieve a predetermined alignment of their respective absorption gradients and so that an edge surface, for receiving incident radiation, of each said length portion is adjacent the respective edge surfaces of said length portions on either side thereof in the stack;

wherein, the adjacent edge surfaces of said length portions form a radiation absorptive face of said radiation absorber.

4. The method of claim 3 wherein said coating step includes the substep of lengthwise feeding each successive length portion of said dielectric material through a sputtering region in which a portion of at least one of said opposing sheet faces of each said length portion is covered with a mask and an unmasked portion of said sheet face is subjected to a sputtering process for coating with said radiation absorbing material, said mask being shaped and said predetermined feed rate being selected so that a predetermined gradient in the thickness of said radiation absorbing material is applied to each said successive length portion of said dielectric material.

5. The method of claim 4 wherein each said length portion of said dielectric material is fed through said sputtering region a first time with the unmasked portion of a first one of its opposing faces subjected to the sputtering process and then fed through said sputtering region a second time with the unmasked portion of a second one of its opposing sheet faces subjected to the sputtering process.

6. The method of claim 4 wherein the unmasked portions of both opposing sheet faces of each said length portion of said dielectric material are simultaneously subjected to the sputtering process.

7. The method of claim 3 wherein said coating step includes the substep of lengthwise feeding each successive length portion of said dielectric material through a spraying region in which a portion of at least one of said opposing sheet faces of each said length portion is covered with a mask and an unmasked portion of said sheet face is subjected to a spraying process for coating with said radiation absorbing material, said mask being shaped and said predetermined feed rat being selected so that a predetermined variation in the thickness of said radiation absorbing material applied to each said successive length portion of said dielectric material.

8. The method of claim 7 wherein each said length portion of said dielectric material is fed through said spraying region a first time with the unmasked portion of a first one of its opposing sheet faces subjected to the spraying process and then fed through said spraying region a second time with the unmasked portion of a second one of its opposing sheet faces subjected to the spraying process.

9. The method of claim 7 wherein the unmasked portions of both opposing sheet faces of each said length portion of said dielectric material are simultaneously subjected to the spraying process.

10. The method of claim 3 wherein said length portions are initially contiguous and form a continuous length of said dielectric material;

said method including the additional step, following said coating step, of cutting said continuous length of dielectric material to provide said individual length portions.

11. The method of claim 3 wherein said length portions of said dielectric material are all of substantially the same length.

12. The method of claim 3 including the additional step, following said coating step and prior to said forming step, of:

coating said length portions of dielectric material with a dielectric coating that substantially covers the electromagnetic radiation absorbing material.

13. The method of claim 12 wherein said dielectric coating acts as a bonding agent to bond the sheet faces of each length portion to the sheet faces of the length portions positioned on either side thereof in the stack.

14. The method of claim 3 wherein said radiation absorbing material is an electrically conductive material, said coating step comprising the steps of:

coating at least one said length portion of said dielectric material with a predetermined catalyst;

immersing said length portion coated with said catalyst into a bath containing a plating solution that includes said electrically conductive material; and withdrawing said length portion from said bath at a predetermined withdrawal rate and in a predetermined direction relative to a width dimension of said length portion, said width dimension being substantially parallel to a direction of said absorption gradient, said predetermined withdrawal rate corresponding to a predetermined function by which a coating thickness of said electrically conductive material on the filaments of said length portion is to vary.

15. The method of claim 14 wherein said immersing step includes the substep of immersing said length portion at a predetermined immersion rate corresponding to said predetermined function.

16. The method of claim 3 wherein said coating step comprises a plurality of coating steps during each of which a different radiation absorbing material is applied to the filaments of at least a portion of each of said length portions.

17. The method of claim 3 wherein said radiation absorbing material is an electrically conductive material, said coating step comprising the steps of:

coating at least one said length portion of said dielectric material which a predetermined catalyst;

immersing said length portion coated with said catalyst into a bath at a predetermined immersion rate and in a predetermined direction relative to a width dimension of said length portion, said width dimension being substantially parallel to a direction of said absorption gradient, said bath containing a plating solution that includes said electrically conductive material, said predetermined immersion rate corresponding to a predetermined function by which a coating thickness of said electrically conductive material on the filaments of said length portion is to vary; and withdrawing said length portion from said bath.

18. A method for producing an electromagnetic radiation absorber, said absorber comprising a block of reticulated dielectric material being formed of randomly oriented filaments, said method comprising the steps of:

coating the filaments of said block with a predetermined catalyst;

immersing said block into a bath at a predetermined immersion rate and in a predetermined direction substantially parallel to a direction of a desired radiation absorption gradient to be formed in said block, said bath containing a plating solution that includes an electrically conductive material, said conductive material plating onto said filaments coated with said catalyst, said predetermined immersion rate corresponding to a predetermined function by which a coating thickness of said conductive material on said filaments is to vary along the direction of said desired radiation absorption gradient; and withdrawing said block from said bath.

* * * * *